United States Patent [19]
Hatzikazakis

[11] Patent Number: 5,170,818
[45] Date of Patent: Dec. 15, 1992

[54] SAFETY VALVE

[75] Inventor: Michael V. Hatzikazakis, Greer, S.C.

[73] Assignee: Westinghouse Air Brake Company, Wilmerding, Pa.

[21] Appl. No.: 797,618

[22] Filed: Nov. 25, 1991

[51] Int. Cl.⁵ .............................................. F16K 15/04
[52] U.S. Cl. ................................... 137/469; 137/538; 137/516.27; 137/539.5
[58] Field of Search .................. 137/469, 516.27, 538, 137/539.5

[56] References Cited

U.S. PATENT DOCUMENTS

| | | | |
|---|---|---|---|
| 2,964,310 | 12/1960 | Stahlhuth | 137/539.5 X |
| 2,987,071 | 6/1961 | Haus | 137/539.5 |
| 3,747,635 | 7/1973 | Garamy | 137/539.5 |
| 4,930,553 | 6/1990 | Grillo | 137/539.5 X |

FOREIGN PATENT DOCUMENTS

| | | | |
|---|---|---|---|
| 200853 | 6/1955 | Australia | 137/469 |
| 777829 | 3/1935 | France | 137/539.5 |
| 1318596 | 1/1963 | France | 137/469 |

Primary Examiner—Robert G. Nilson
Attorney, Agent, or Firm—J. B. Sotak

[57] ABSTRACT

A safety valve including a brass valve body having a through bore provided with a circular sharp-edged valve seat and another sharp edge. A valve stem carrying a ball valve and a biasing spring disposed in the through bore. A cap member screwed through onto the brass valve body and causing the ball valve to be seated on the sharp-edged valve seat and causing the ball valve to be positioned in close proximity to the other sharp edge. A plurality of radially vent holes formed in the brass valve body for venting fluid pressure to atmosphere when the ball valve becomes unseated from the sharp-edged valve seat. A lock nut for locking the cap member in position and a spring pin carried by the valve stem to permit the ball valve to be manually opened.

17 Claims, 1 Drawing Sheet

SAFETY VALVE

FIELD OF THE INVENTION

This invention relates to an improved safety valve device and in particular to a pressure relief valve having a stainless steel ball valve member and having a sharp-edged brass valve seat in which an adjustable biasing spring urges and positively seals the valve member on the valve seat until the pressure force on the valve member exceeds the force of the biasing spring.

BACKGROUND OF THE INVENTION

In fluid pressure systems, it is common practice to employ safety valve devices which allow excessive pressure to escape to atmosphere when the pressure reaches a predetermined level in order to prevent damage to the equipment and to preclude injury to individuals in the area. In the past, one type of safety valve device included a conical valve member which was biased toward a closed or cut-off position by a compression spring to prevent unwanted loss of fluid when the pressure in the system was below the predetermined pressure safety level. However, these previous conical safety valves were susceptible to unintentional fluid pressure leakage due to improper seating of the conical valve member with the valve seat. In order to minimize leakage through a seated valve, it was common practice to lap the conical brass valve member against the brass valve seat to attempt to make a good seal. The lapping process was not always successful in contouring the surface of the valve to that of the seat. Further, the lapping is both lengthy and a difficult task, as well as an expensive process which results in high manufacturing costs and excessive selling prices. In addition, it has been found that during the opening operation, the conical valve was exposed to high frequency oscillations or chattering which resulted in multiple impacts on the valve seat in a very short period of time. Consequently, the sealing capability of these former valves quickly deteriorated and eventually resulted in excessive leakage of fluid pressure.

SUMMARY AND OBJECT OF THE INVENTION

Accordingly, it is an object of this invention to provide a new and improved safety valve device which provides a positive seal in a closed position to minimize fluid pressure leakage.

Another object of this invention is to provide a unique pressure relief valve which effectively seals the fluid pressure in a pneumatic system.

A further object of this invention is to provide a novel pressure safety valve employing a stainless steel ball valve which is adapted to effectively seat on a sharp edge formed in a central bore of a valve body and having another sharp edge formed in the central bore which allows the stainless steel ball valve to unseat at a preselected pressure level and to reseat at a pressure level which is five percent to six percent (5% to 6%) below the preselected pressure level.

Still another object of this invention is to provide a safety valve device comprising, a valve body having an internal axial through hole for receiving a valve stem and a coiled spring for normally urging a valve member against a circular sharp-edged seat formed in the through hole, another circular sharp edge formed in said through hole in spaced relationship with the valve member, a plurality of radially extending discharge ports formed in the valve body and being opened to the atmosphere, and an adjustable cap threaded on the valve body for changing the spring tension of the coiled spring for setting a preselected pressure level at which the valve member is unseated from the circular sharp-edged seat and the valve member is reseated at a pressure which is less than the preselected pressure level.

Still a further object of this invention is to provide a pressure relief valve comprising, a brass valve body having an axial circular bore extending therethrough a valve stem and a biasing spring disposed in the axial circular bore for urging a stainless steel ball valve against a sharp-edged seat formed in the axial circular bore, a sharp edge formed in the axial circular bore and disposed a slight distance away from the stainless steel ball valve, a threaded cap screwed onto the valve body for adjusting and setting the pressure level at which the stainless steel ball valve is unseated from said sharp-edged seat and vents fluid pressure to atmosphere, and a lock nut screwed onto the valve body for locking the threaded cap in place.

Yet a further object of this invention is to provide a novel safety valve which is economical in cost, simple in design, reliable in service, durable in use, and efficient in operation.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
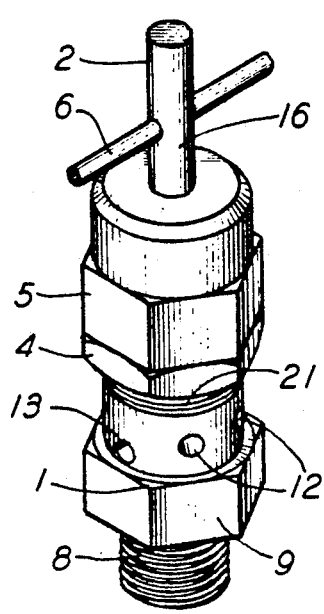
FIG. 1 is a perspective assembly view of the safety or pressure relief valve device embodying the unique features in accordance with the present invention.
Figure 2:
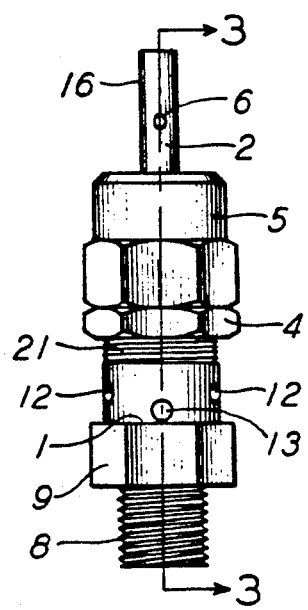
FIG. 2 is an elevational view of the valve of FIG. 1.

Referring now to the drawings, and in particular to FIGS. 1, 2, 3, and 4, there is shown a pressure relief or safety valve device which includes a brass valve body 1, a valve stem assembly 2, a biasing spring 3, a lock nut 4, an adjusting nut or cap 5, and a cylindrical roll or spring pin 6.

Figure 3:
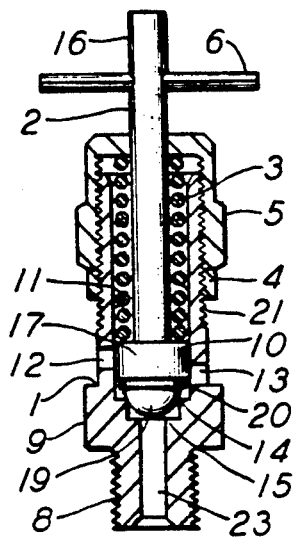
FIG. 3 is a cross-sectional view of FIG. 2 taken along lines 3—3.
Figure 6:
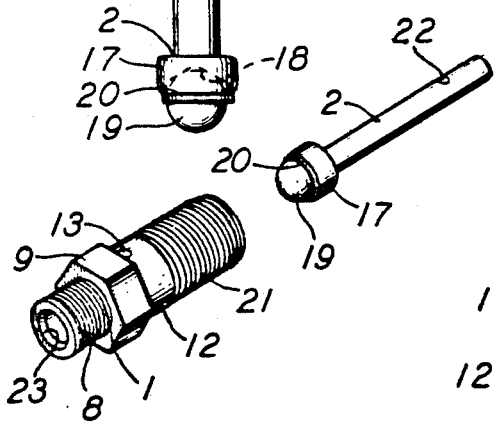
FIG. 6 is an elevational view partly in phantom of the valve stem assembly of the safety valve.
Figure 6:
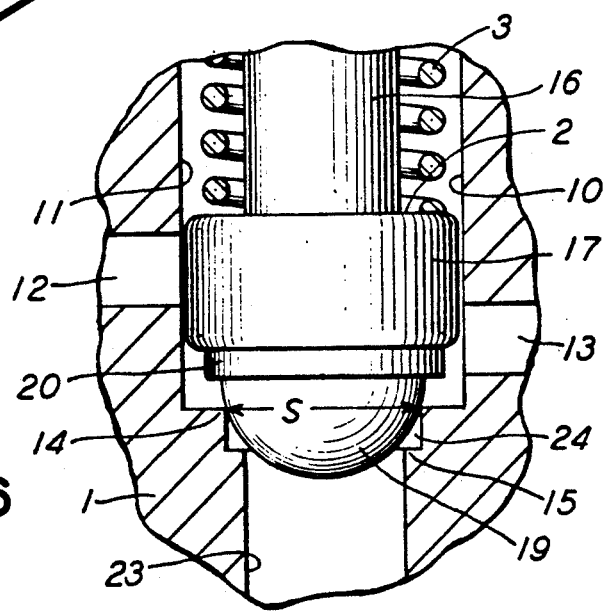

As shown, the brass valve body 1 includes a reduced integral male pipe-threaded nipple portion 8 which is adapted to be screw-threaded into a female receiving member which may be located on a compressor, reservoir or any other suitable pressure vessel whose discharge is to be controlled or internal pressure is to be regulated. It will be noted a hexagonal nut portion 9 is located intermediate the ends of the valve body 1 for accommodating a suitable wrench or the like. It will be seen that the valve body 1 is provided with a central circular axial through bore 10 having an upper enlarged passageway 11 for receiving the valve stem assembly 2 and the coiled compression spring 3, as will be described hereinafter. As shown in FIGS. 1, 2, 3, 4, and 6, a plurality of lateral or radial discharge ports 12 and 13 extend around the valve body and are opened to the atmosphere. The secondary discharge ports 12 are slightly higher than the principal port 13 which is located substantially at the lower extremity of the enlarged passageway 11, the purpose of which will be described hereinafter. Further, as shown in FIGS. 3 and 6, the diameter of bore 10 is reduced to form a circular sharp-edged seat 14 and is further reduced to form a second or another circular sharp-edged 15.

Figure 5:
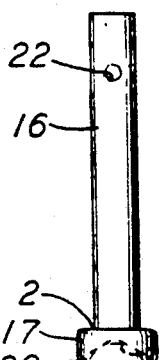
FIG. 5 is a partial enlarged view partly in section of the ball valve and valve seat of the safety valve.
Figure 4:
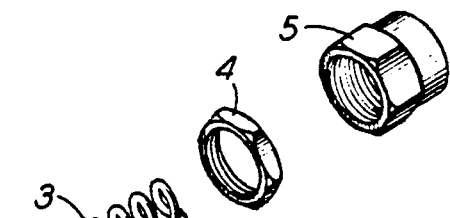
FIG. 4 is an exploded perspective view of the components of the safety valve of the present invention.

It will be seen that valve stem assembly 2 is positioned within the enlarged passageway portion 11 of the central through bore 10. The valve assembly includes a long slender cylindrical shaft or brass stem 16 terminating into an enlarged cylindrical head portion 17. As shown in phantom in FIG. 5, the bottom end of the enlarged cylindrical head 17 includes a bore or drilled hole 18 which is sized to receive a stainless steel ball valve 19. In practice, the stainless steel ball valve 19 is initially placed within bore hole 18 formed in head portion 17 and then the lower peripheral extremity 20 of the head portion 17 is crimped or rolled to securely hold the ball valve 19 in place or the ball may be press-fitted into bore 18 by having a small interference fit. Next, the coil spring 3 is placed over the stem member 16 so that its lower end rests on the upper surface of cylindrical head portion 17. It will be seen that the brass hexagonal lock nut 4 is threaded onto the machine screw threads 21 formed on the upper portion of the brass valve body 1. Next, the apertured brass cap nut 5 is fitted over the remote extremity or upper end of stem 16 and is screwed onto the threads 21. Then the split roll pin 6 is inserted and driven into the hole 22 formed in the upper end of stem 16. The roll pin 6 is centered in relation to stem 16 so that the ball valve 19 may be lifted off the sharp-edged seat 14 merely by manually grabbing and pulling the respective ends with the index and middle fingers. It will be seen in FIG. 3 that the compression spring 3 is caged between the upper surface of head 17 and the underside of the top of the brass cap nut 3. It will be appreciated that the jam nut 4 is utilized to lock the adjusting cap nut 5 in a proper adjusted position for obtaining the proper compression on coil spring 3 and thus the proper pressure setting for opening or unseating the stainless steel ball valve 19 from the sharp-edged seat 14 is readily obtained.

As noted above, the roll or spring pin 6 may be used to manually unseat the ball valve 19 to bleed off the fluid pressure in passageway 23 by pulling and compressing the coiled spring 3.

Let us now assume that the safety valve is set for one hundred and sixty pounds per square inch gage (160 psig) so that the ball valve 19 will remain seated on seat 14 until sufficient fluid pressure, namely, 160 psig, is developed in passageway 23 and chamber 24. Referring to FIG. 6, it will be seen that upon reaching a 160 psig, the fluid pressure force acting on the lower spherical surface area S of the ball valve 19 will overcome the compressive force of the biasing spring 3 and will begin unseating the stainless steel ball valve 19 from the sharp-edged seat 14. As the valve opens, the even distribution of the air flow caused by the smooth surface of the stainless steel ball effectively alleviates and/or eliminates the high frequency oscillations and/or chattering, as well as the multiple impacting of the valve against the seat which obviously improves the overall operation, life and durability of the safety valve.

As previously mentioned, the body of the present safety valve is provided with a second or additional lower circular sharp-edged 15. The lower sharp edge allows the ball valve 19 to reseat within a five percent to six percent (5%–6%) of the opening pressure level. This is the result of a phenomenon of the pressure head loss coefficient. During the lifting or opening of the ball valve 19, the air flow film that is developed over the sharp edge 15 causes a pressure head loss coefficient which approaches or is effectively equal to one (1). This means that the air flow does not have enough pressure built into it to support the weight of the stem/ball assembly and the force exerted by the spring 3. This enables the biasing spring 3 to overcome the pressure of the air flow film and allows the ball valve 19 to reseat. Thus, the present safety valve is opened or unseated at a 160 psig and is closed or reseated at approximately one hundred and fifty to one hundred and fifty-two pounds per square inch gage (150-152 psig) which complies with the requirements of the end user, namely, the customer and/or buyer.

Thus, the present invention has been described in such full, clear, concise and exact terms as to enable any person skilled in the art to which it pertains to make and use the same, and having set forth the best mode contemplated of carrying out this invention. I state that the subject matter, which I regard as being my invention, is particularly pointed out and distinctly set forth in what is claimed. It will be understood that variations, modifications, equivalents and substitutions for components of the above specifically-described embodiment of the invention may be made by those skilled in the art without departing from the spirit and scope of the invention as set forth in the appended claims.

What I claim is:

1. A safety valve device comprising, a valve body having an internal axial through hole for receiving a valve stem and a coiled spring for normally urging a valve member against a circular sharp-edged seat formed in said through hole, another circular sharp edge formed in said through hole and disposed in the same direction as said circular sharp-edged seat and situated in spaced relationship with said valve member to permit the development of an air flow film over said circular sharp edge, a plurality of radially extending discharge ports formed in said valve body and being opened to the atmosphere, and an adjustable cap threaded on said valve body for changing the spring tension of said coiled spring for setting a preselected pressure level at which said valve member is unseated from said circular sharp-edged seat and said valve member is reseated at a pressure which is less than said preselected pressure level due to the air flow film.

2. The safety valve device as defined in claim 1, wherein at least one of said plurality of radially extending ports is located adjacent said circular sharp-edged seat.

3. The safety valve device as defined in claim 1, wherein said valve stem includes an enlarged head portion formed on one end thereof.

4. The safety valve device as defined in claim 3, wherein said enlarged head portion having an aperture for receiving said valve member.

5. The safety valve device as defined in claim 4, wherein said valve member is a ball which is fitted into said aperture.

6. The safety valve device as defined in claim 1, wherein said valve member is a stainless steel ball carried by said valve stem.

7. The safety valve device as defined in claim 5, wherein a rim of said aperture is crimped to securely hold said ball.

8. The safety valve device as defined in claim 1, wherein said valve stem extends beyond said adjustable cap so that said valve member may be manually unseated.

9. The safety valve device as defined in claim 8, wherein a spring pin is inserted into said valve stem.

10. The safety valve device as defined in claim 1, wherein a lock nut is threaded on said valve body to lock said adjustable cap in place.

11. A pressure relief valve comprising, a brass valve body having an axial circular bore extending therethrough, a valve stem and a biasing spring disposed in said circular bore for urging a stainless steel ball valve against a sharp-edged seat formed in said circular bore, a sharp edge formed in said circular bore facing said sharp-edged seat and disposed a slight distance away from said stainless steel ball valve to cause an air flow film to be developed across said sharp edge to permit said stainless steel ball valve to reseat at a pressure level which is less than a preset unseating pressure level, a threaded cap screwed onto said valve body for adjusting and presetting the pressure level at which said stainless steel ball valve is unseated from said sharp-edged seat and vents fluid pressure to atmosphere, and a lock nut screwed onto said valve body for locking said threaded cap in place.

12. The pressure relief valve as defined in claim 11, said valve stem includes a long shaft extending through said threaded cap and having an enlarged head for retaining said stainless steel ball valve.

13. The pressure relief valve as defined in claim 12, wherein said stainless steel ball valve is embedded in said enlarged head of said valve stem.

14. The pressure relief valve as defined in claim 12, wherein said enlarged head includes a bore for receiving said stainless steel ball valve which is held in place by a rolled rim.

15. The pressure relief valve as defined in claim 12, wherein said long shaft extending through said threaded cap includes a handle for manually unseating said stainless steel ball valve from said sharp-edged seat.

16. The pressure relief valve as defined in claim 11, wherein said brass valve body includes a plurality of radial vent holes leading to the atmosphere.

17. The pressure relief valve as defined in claim 11, wherein said stainless steel ball valve has a smooth surface which allows an even distribution of the air flow during unseating for alleviating chattering and impacting.

* * * * *